United States Patent
Valcu et al.

(10) Patent No.: US 11,699,461 B1
(45) Date of Patent: Jul. 11, 2023

(54) THERMALLY-ASSISTED MAGNETIC RECORDING (TAMR) HEAD WITH MAGNETIC ASSIST CURRENT

(71) Applicant: Headway Technologies, Inc., Milpitas, CA (US)

(72) Inventors: Bogdan Florin Valcu, Fremont, CA (US); Tobias Maletzky, San Jose, CA (US); Weihao Xu, San Jose, CA (US); Alain Truong, Santa Clara, CA (US); Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/733,929

(22) Filed: Apr. 29, 2022

(51) Int. Cl.
*G11B 5/48* (2006.01)
*G11B 5/31* (2006.01)
*G11B 5/60* (2006.01)
*G11B 5/00* (2006.01)

(52) U.S. Cl.
CPC ............ *G11B 5/6082* (2013.01); *G11B 5/607* (2013.01); *G11B 5/6088* (2013.01); *G11B 2005/0021* (2013.01)

(58) Field of Classification Search
CPC .. G11B 5/58; G11B 5/48; G11B 5/127; G11B 5/115; G11B 5/1278; G11B 5/187; G11B 3/3116; G11B 5/13133; G11B 5/3146; G11B 2005/0018; G11B 5/40
USPC .......................................... 360/59; 369/13.33
See application file for complete search history.

(56) References Cited

U.S. PATENT DOCUMENTS

| 8,000,178 B2 | 8/2011 | Shimazawa et al. |
| 10,679,650 B2 * | 6/2020 | Bai ........................... G11B 5/23 |

OTHER PUBLICATIONS

Chen, W. et al., "Magnetic Recording Assisted by Spin-Transfer-Torque-Induced Magnetization Reversal and Dynamics", 2021 IEEE 32nd Magnetic Recording Conference (TMRC), pp. 1-2, 2021.
Czoschke, P.J. et al., "Direct Measurement of Magnetic Timing Jitter in Writers", 2021 IEEE 32nd Magnetic Recording Conference (TMRC), pp. 1-2, 2021.
Ding, Y. et al., "Sub-Nanosecond Switching of Spin-Transfer-Torque Device for Energy-Assisted Perpendicular Magnetic Recording", 2021 IEEE 32nd Magnetic Recording Conference (TMRC), pp. 1-2, 2021.

(Continued)

*Primary Examiner* — Nabil Z Hindi
(74) *Attorney, Agent, or Firm* — DLA Piper LLP (US)

(57) ABSTRACT

The present embodiments relate to a thermally-assisted magnetic recording (TAMR) head. A magnetic assist current can be applied to the TAMR head to assist in reducing timing jitter as the TAMR head interacts with a magnetic recording material. The TAMR head can include a main write pole including a tip portion and configured to direct a magnetic field for interacting with a magnetic recording medium. The TAMR head can include a laser diode to heat the magnetic recording medium and a dynamic fly height (DFH) heating element for dynamically controlling a height of the main write pole. The heating element can be of a parallel bias circuit that directs a direct current (DC) bias current flow along an electrical path from the magnetic yoke element to the tip portion of the main write pole adjacent to an air bearing surface (ABS).

20 Claims, 14 Drawing Sheets

(56) References Cited

OTHER PUBLICATIONS

Takano, K. et al., "Optical Design Challenges of Thermally Assisted Magnetic Recording Heads", IEEE Transactions on Magnetics, vol. 46, No. 3, pp. 744-750, Mar. 2010.
Valcu, B.F., et al., "Relationship Between Equalized SNR and Jitter—Theory and Application to PMR and HAMR", IEEE Transactions on Magnetics, vol. 50, No. 11, pp. 1-4, Article Sequence No. 3001804, Nov. 2014.

* cited by examiner

THERMALLY-ASSISTED MAGNETIC RECORDING (TAMR) HEAD WITH MAGNETIC ASSIST CURRENT

TECHNICAL FIELD

Embodiments of the invention relate to the field of electro-mechanical data storage devices. More particularly, embodiments of the invention relate to the field of a thermally-assisted magnetic recording head for a hard disk drive (HDD).

BACKGROUND

Volumes of digital data are capable of being stored on disk drives. For instance, a hard disk drive (HDD) is an electro-mechanical data storage device that can store and retrieve digital data using magnetic storage techniques. The digital data can be written to and read from a disk using one or more heads that are positioned near the disk to detect and modify a magnetization of the disk.

As more information is digitized, the total amount of data that is stored digitally on such disk drives is rising at an exponential rate. For instance, with the growth in cloud-based storage, digital data is being stored on disk drives on a Zeta Byte (ZB) scale. In order to control cost and power consumption with this increase in the total amount of digital data stored, memory capacity on disk drives needs to be increased. Some digital recording technologies, such as Perpendicular Magnetic Recording (PMR) and Shingled Magnetic Recording (SMR), may generally not be able to increase memory capacity in disk drives to keep up with the growth in the total amount of digital data being stored.

Accordingly, digital recording technologies that are capable of supporting the Zeta Byte (ZB) scale of digital data storage are to be implemented. One such technology can include Heat Assisted Magnetic Recording (HAMR), otherwise known as TAMR (Thermally-Assisted Magnetic Recording). TAMR generally relates to a magnetic storage technology that temporarily heats the disk material during writing. Heating the disk material can allow for the disk to be more receptive to magnetic effects and allows for writing to smaller regions, thereby increasing the capacity of digital data capable of being stored on the disk.

SUMMARY

A head for a disk drive is described. Particularly, the present embodiments relate to a thermally-assisted magnetic recording (TAMR) head with a magnetic assist current. The magnetic assist current can include a direct current (DC) current flow directed along an electrical path through a main write pole of a TAMR head to increase system performance in the TAMR head.

In one embodiment, a thermally-assisted magnetic recording (TAMR) head is described. The TAMR head can include a main write pole including a tip portion. The main write pole can be configured to direct a magnetic field for interacting with a magnetic recording medium (e.g., such as to write to the magnetic recording medium). The TAMR head can also include a magnetic yoke element. The TAMR head can also include a dynamic fly height (DFH) element including a heating element. The heating element can be part of a parallel bias circuit that, when energized, directs a direct current (DC) bias current flow along an electrical path from the magnetic yoke element to the tip portion of the main write pole adjacent to an air bearing surface (ABS).

In some embodiments, the TAMR head can include a heat sink. The heat sink can be connected to the main pole and can include a portion of metallic material contacting the main write pole with a height in a range between 300-400 nanometers and disposed adjacent to the ABS. In some embodiments, the heat sink can be connected to a second electrical pad and is disposed at an angle of around 25 degrees with respect to the ABS. In some embodiments, the heat sink comprises Ruthenium.

The parallel bias circuit can include a series resistor. In a first example, the series resistor is disposed in the parallel bias circuit in series between a first electrical pad and the main write pole. The parallel bias circuit can further include the heat sink connected in series between the main write pole and a second electrical pad, the first electrical pad and second electrical pad generating the DC bias current. In a second example, the series resistor is disposed in the parallel bias circuit between the first electrical pad to the main write pole and ground to the heat sink.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1A:
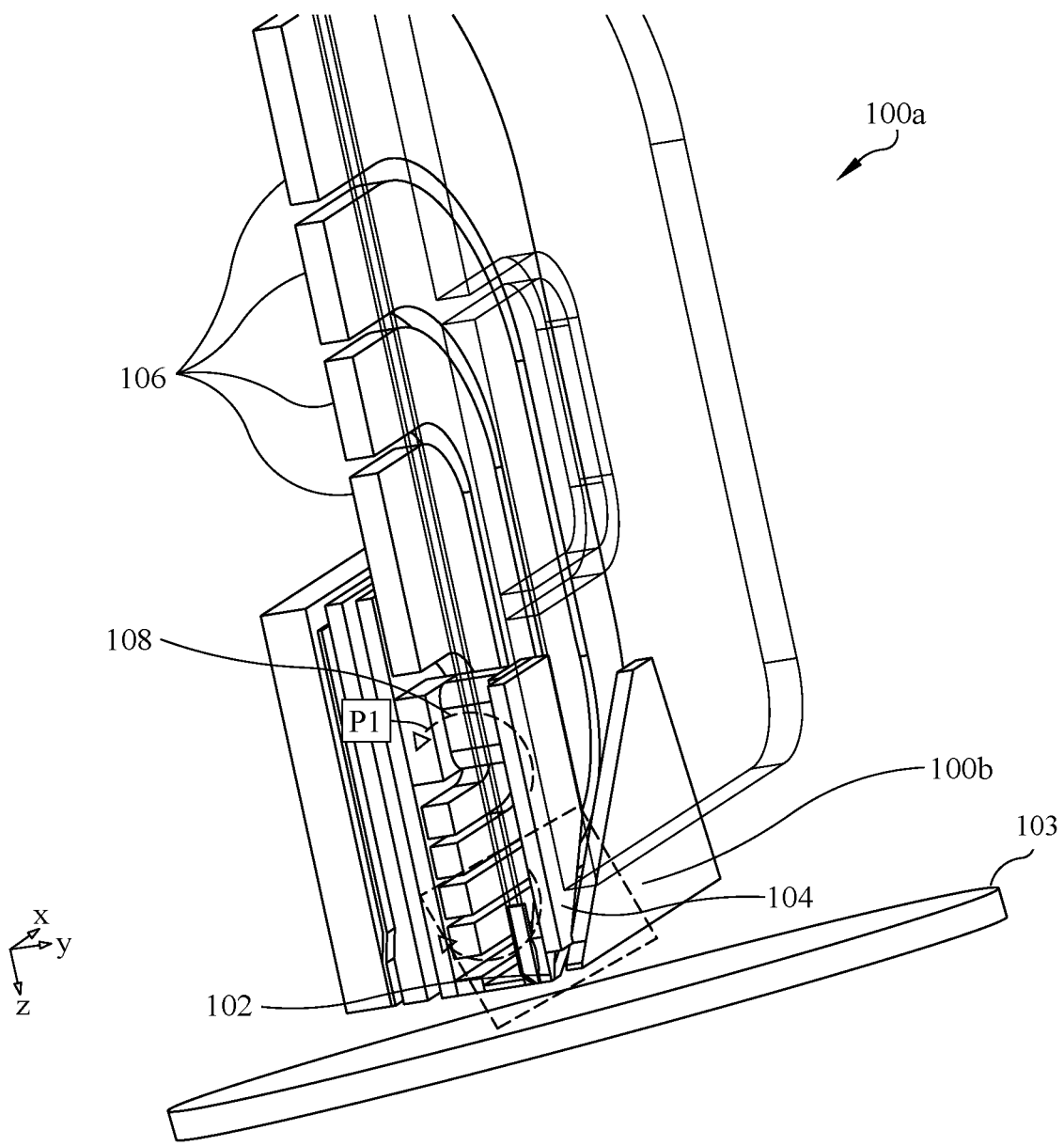
FIG. 1A illustrates an example TAMR head according to an embodiment.

Hard disk drives (HDDs) are electro-mechanical data storage devices used to store digital data. For instance, an HDD stores and retrieves digital data using magnetic storage and rotating disks coated with a magnetic material. As the volume of digital data storage increases, the data storage capacity of HDDs also needs to increase. For instance, to support the zeta-byte scale of digital data storage (e.g., cloud storage), specific HDD storage technologies need to be utilized to efficiently increase data storage capacity. One such HDD storage technology can include Heat Assisted Magnetic Recording (HAMR), otherwise known as Thermally-Assisted Magnetic Recording (TAMR).

TAMR is a magnetic storage technology that temporarily heats the disk material during writing. Heating the disk material can make the disk more receptive to magnetic effects and allows for writing to smaller regions, thereby increasing the capacity of digital data capable of being stored on the disk. Further, to ensure stability of information stored in high-capacity disk drives, TAMR record media may include a high anisotropy at room temperature. In some instances, an ability to write by an inductive pole may not be possible. Therefore, heating by laser may be required to bring the recordable medium close to a specified temperature (e.g., a Curie point), to enable writing by the magnetic field.

A Near Field Transducer (NFT) is a component in the TAMR system that comprises a type of plasmonic nanoscale antenna. The NFT can include one or more thin metallic layers with plasmonic properties to focus the light from a laser diode into a spot (e.g., a sub-diffraction limit spot) to heat the recording medium. The magnetic pole of the TAMR head can be placed in close proximity to (or adjacent to) the NFT. Further, the writing of the magnetic transitions on the disk can take place by the superposition of the thermal spot generated by the NFT with an alternating current (AC) magnetic field generated by coils disposed around an inductive pole.

With TAMR-based HDD systems, data can be written on the disk as regions with magnetization polarization alternatively directed perpendicular to the disk surface. The transition region can be determined temporally by a time duration in which the AC current to the write pole through coils generating the AC current changes polarity. Alternatively, the transition region can be determined spatially by the superposition of the magnetic field profile with the anisotropy of the media under the hot thermal spot created by the NFT. Any deviation from perfect behavior can result in timing jitter and spatial jitter, which can lead to loss in system performance (e.g., measured in bit rate error (BER)).

The present embodiments relate to methods and systems for directing a direct current (DC) current flow along an electrical path through a main write pole of a TAMR head. The current can be applied between a top portion of a magnetic yoke and a tip of the main write disposed adjacent to an air-bearing surface (ABS). The TAMR head can include a write dynamic fly height (DFH) heater that is part of a parallel bias circuit that can generate the current flow in the main write pole.

In a first embodiment, the parallel bias circuit can include a series resistor disposed between a first contact pad (or a DFH (+) pad) to the magnetic yoke that connects to the back of main pole (MP). A lead and a via can be added to contact a heat sink (e.g., a Ruthenium (RU) heat sink) connected to the main write pole to a second contact pad (or a DFH ground pad). In another embodiment, the parallel bias circuit can include a series resistor disposed from the DFH (+) pad to a side of the main write pole and ground to a heat sink that connects the main write pole.

In some embodiments, the TAMR head can include a modified geometry for a heat sink of the main write pole. The metallic heat sink can be adjacent to the main pole and can include only a thin strip of metallic material contacting the main write pole only in a region of 300-400 nanometers (nm) adjacent to the ABS. The strip of metallic material can run toward a back portion of the head structure at an angle of around 25 degrees with respect to the ABS. The size of the strip of metallic material in the heat sink can assist in keeping the main pole temperature below a threshold to mitigate reliability issues with main pole oxidation.

Further, a DC current can be directed down an electrical path between a top portion of a magnetic yoke and a tip of the main write disposed adjacent to the ABS. This direction of DC current can reduce domain wall pinning that can occur during magnetization reversal by an AC current, which can reduce timing jitter in the TAMR head.

Figure 1B:
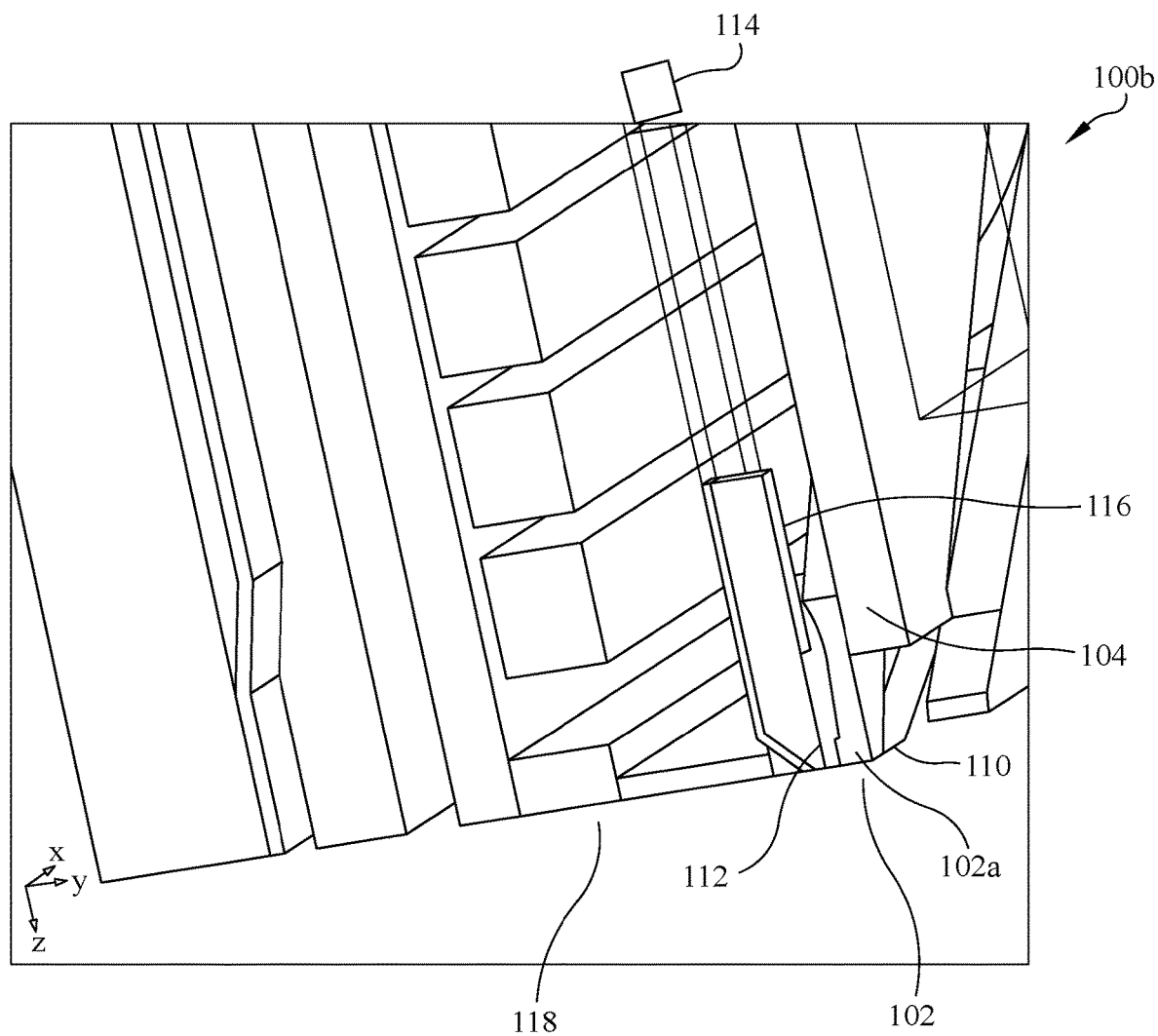
FIG. 1B illustrates a portion of an example TAMR head near the tip portion of the main write pole according to an embodiment.

As noted above, a TAMR head can read and write from a magnetic recording material. FIG. 1A illustrates an example TAMR head 100a according to an embodiment. As shown in FIG. 1A, the TAMR head 100a can include a main write pole 102. The main write pole 102 can include a tip portion (e.g., 102a as shown in FIG. 1B) that can transform magnetic fields and electrical currents to read and write to a disk (e.g., disk 103). For example, the main write pole 102 can transform the electrical current into a magnetic field to write to the disk 103. The disk 103 can include a platter comprising a magnetic recording material that can be configured to rotate about an axis.

The TAMR head 100a can include one or more coils 106 disposed around an inductive pole 108 to generate an alternating current (AC) current flow. The AC current flow can flow from the inductive pole 108 to the main write pole 102 via path P1 to generate a magnetic field as described herein.

The TAMR head 100a can further include a magnetic yoke 104. The magnetic yoke 104 can be connected to the main write pole 102 and/or the coils 106 to facilitate the path P1 of AC current flow between the inductive pole 108 and main write pole 102.

FIG. 1B illustrates a portion 100b of the TAMR head near the tip portion 102a of the main write pole 102. As shown in FIG. 1B, the tip portion 102A may not be direct contact with the magnetic yoke 104 (otherwise referred to as a "recessed" magnetic yoke 104). The main write pole 102 may also be in contact with a heat sink 110. As described in greater detail below, heat sink 110 can be configured to dissipate heat from the main write pole 102.

Further, the main write pole 102 can be in close proximity (e.g., adjacent) to a near field transducer (NFT) 112. The NFT 112 can include a plasmonic nanoscale antenna that includes one or more thin metallic layers that include plasmonic properties. The NFT 112 can focus light from a laser diode into a (sub-diffraction limit) spot to heat the recording disk. The NFT 112 can be part of a laser diode system including a laser diode 114 configured to emit a laser light source, a waveguide 116 to direct the laser light source, and the NFT 112. In some embodiments, the laser diode 114 can operate in a near-infrared wavelength spectrum (e.g., wavelengths between 700-900 nm).

The writing of magnetic transitions on the disk can take place by the superposition of a thermal spot generated by the NFT 112 with an alternating current (AC) magnetic field generated by the main write pole 102. In some instances, to ensure stability of the stored material, the recording disk may include a high anisotropy at room temperature. Accordingly, heating of the recording disk near the laser can be used to bring the disk close to a temperature (e.g., Curie point of the disk) to enable writing by the magnetic field.

The tip portion 102a of the main write pole 102 can be spaced from the magnetic recording material by an air-bearing surface (ABS) 118 of the TAMR head. This space can be controlled by a dynamic fly height (DFH) element 120 (as shown in FIG. 2.

A heat sink 110 can mitigate overheating in the main write pole. In some instances, the heat sink 110 can comprise any of a variety of metallic materials, such as Ruthenium (Ru). As described in greater detail below, the TAMR head can include a modified heat sink geometry. The metallic heat sink 110 can be adjacent to the main pole 102 and can include only a thin strip of metallic material contacting the main write pole 102 only in a region of 300-400 nanometers (nm) adjacent to the ABS 118. The strip of metallic material can run toward a back portion of the head structure at an angle of around 25 degrees with respect to the ABS 118. The size of the strip of metallic material in the heat sink 110 can assist in keeping the main pole temperature below a threshold to mitigate reliability issues with main pole oxidation.

Figure 2:
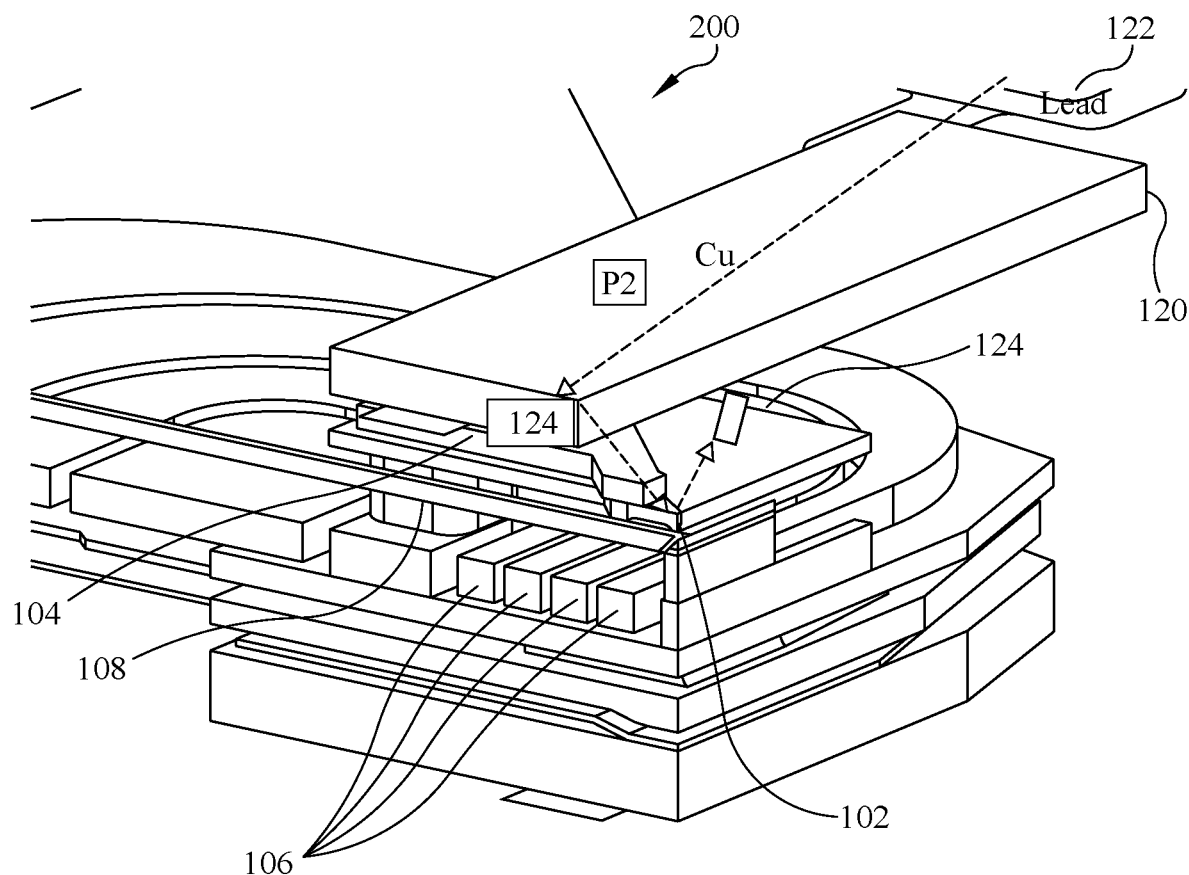
FIG. 2 is a side view of an example TAMR head according to an embodiment.

FIG. 2 is a side view of an example TAMR head according to an embodiment. As shown in FIG. 2, the main write pole 102 and magnetic yoke 104 can be in electrical communication with a heating element 120. A dynamic fly height (DFH) heating element 120 (or heating element 120 or DFH heater 120) can include a heater that can heat the main write pole 102 and modify the distance between the main write pole 102 and magnetic recording material (e.g., disk 103). For example, the heating element 120 can implement a resistor that can obtain a DC current flow, thereby heating the resistor through electrical resistance and modifying the distance between the main write pole 102 and magnetic recording material.

Heating element 120 can be connected to multiple contact pads 122, 124. A first contact pad 122 can provide a positive electrical energy, such as a lead. The second contact pad 124 can be connected to the heat sink 110 and can provide a ground for the heating element 120.

The heating element 120 can be part of a parallel bias circuit. The parallel bias circuit can include a circuit connecting contact pads 122, 124 with the main write pole 102, heating element 120, and heat sink 110. The parallel bias circuit can generate a bias current (e.g., a direct current (DC) current flow) to the main write pole as described herein.

In an example, the parallel bias circuit can include a series resistor (connected to first contact pad 122) in series with the main write pole 102 and heat sink 110 all connected in parallel with the heating element 120. The parallel bias circuit can provide a second electrical path (P2) for directing the DC current flow from the magnetic yoke 104 to the main write pole 102 and to the heat sink 110 as described herein. Details relating to the parallel bias circuit is discussed with respect to FIGS. 8A and 8B.

As described above, a DC bias current can be applied (e.g., a magnetic assist current (MAC)) to the main write pole. The current can flow from the back of the main pole towards the ABS. The DC current can be applied at the top of the magnetic yoke and place the ground near the main pole tip, close to the ABS.

As noted above, the recording disk can be heated in order for the TAMR head to write to the disk. This heating causes a thermal gradient that can impact a performance of the TAMR head in writing the disk. The thermal gradient can include the ratio of a temperature difference and a distance between two points. In some instances, a driver of system performance of a TAMR-based head (as measured in Bit-Rate-Error (BER)) can include the thermal gradient generated during the heating of the disk.

Figure 3A:
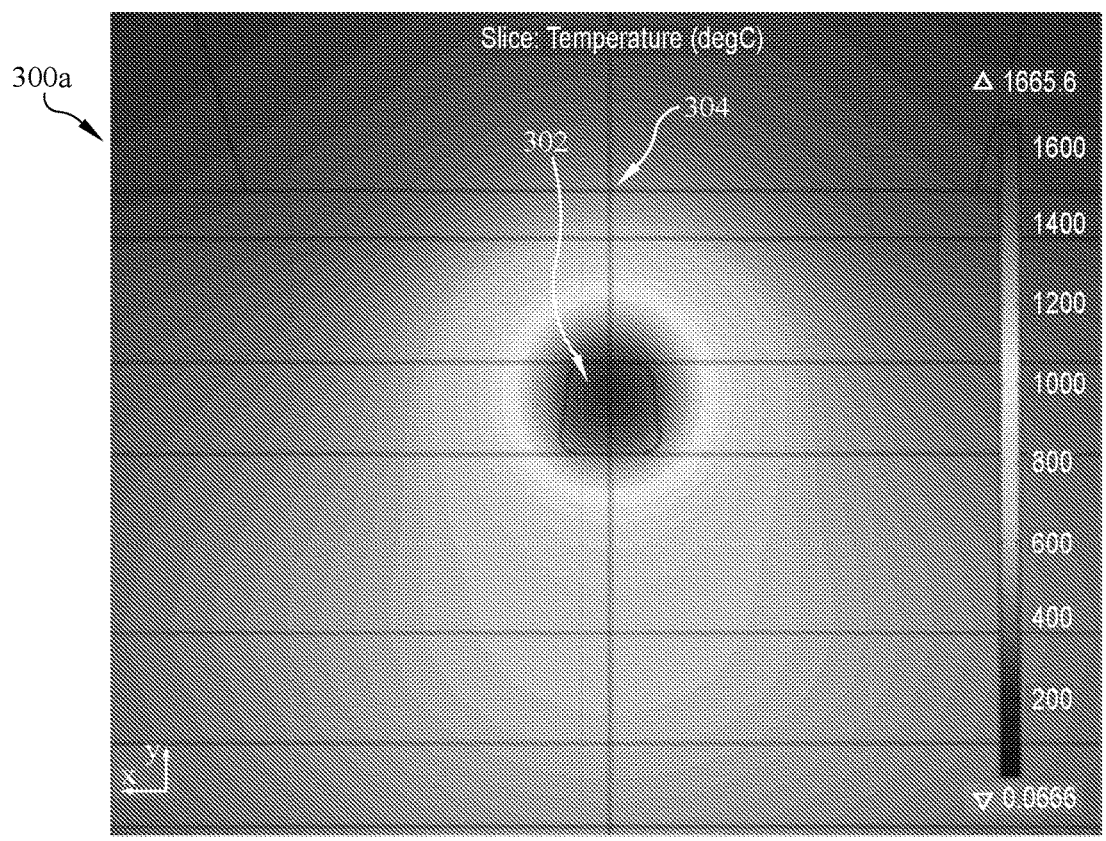
FIG. 3A provides a first graphical representation illustrating a temperature relative to a distance (e.g., in nm) from a heat source according to an embodiment.
Figure 3B:
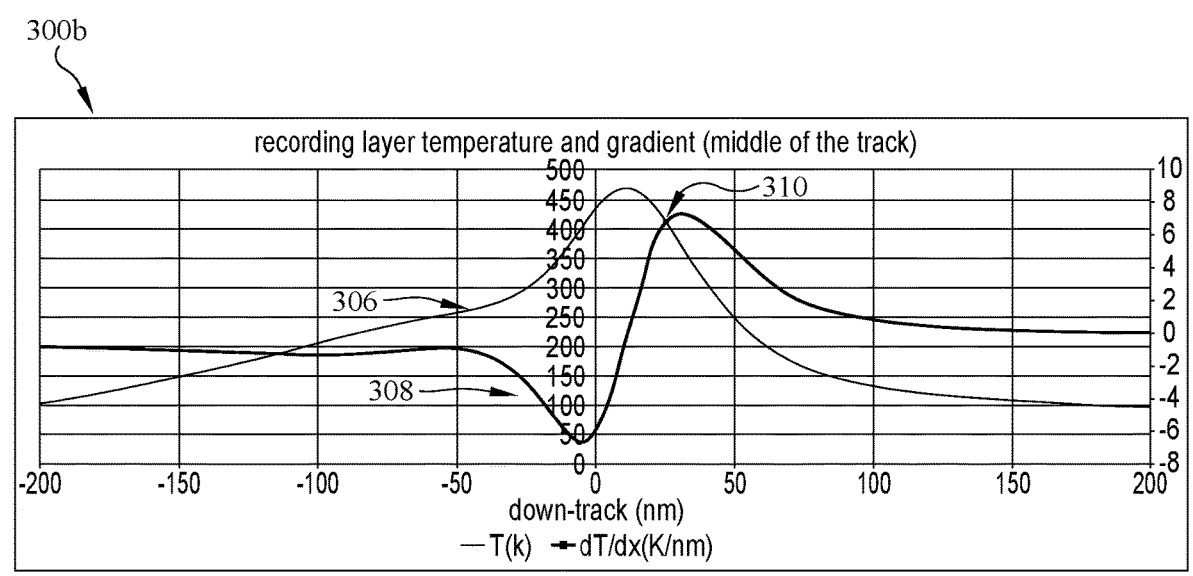
FIG. 3B provides a second graphical representation illustrating the recording layer temperature and gradient according to an embodiment.

FIGS. 3A and 3B provide graphical representations illustrating features correlating recording medium temperature and thermal gradient. FIG. 3A provides a first graphical representation 300a illustrating a temperature relative to a distance (e.g., in nm) from a heat source. As shown in FIG. 3A, at a central point 302, a temperature may be at a highest level. Further, as the distance from the central point 302 increases, the temperature is lower. For instance, at point 304 a distance away from central point 302, the temperature is reduced. The thermal gradient can be derived based on a magnitude of the temperature loss as the distance increases from the central point 302.

FIG. 3B provides a second graphical representation 300b illustrating the recording layer temperature and gradient. As shown in FIG. 3B, a first line 306 provides a temperature at various distances along a track of a recording medium. A second line 308 provides the thermal gradient along the distances of the track of the recording medium. A confluence point 310 can provide a thermal gradient that corresponds with the increased temperature (e.g., from the heating of the recording material). This confluence point 310 can indicate a thermal gradient with increased system performance, as described with respect to FIG. 4 below.

Figure 4:
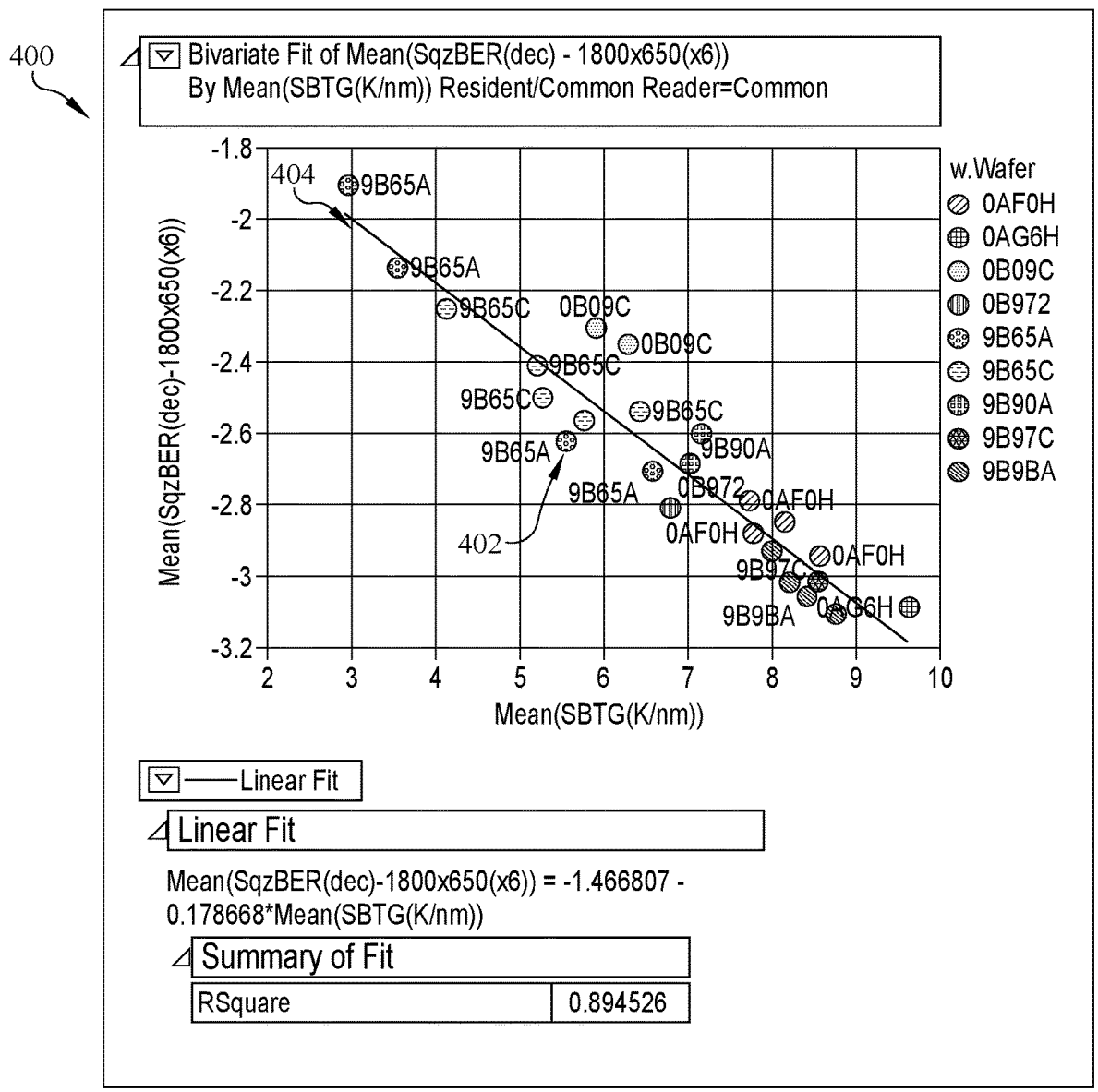
FIG. 4 provides a graph illustrating a relationship between thermal gradient and bit rate error (BER) according to an embodiment.

FIG. 4 provides a graph 400 illustrating a relationship between thermal gradient and bit rate error (BER). In FIG. 4, the X axis can provide a mean thermal gradient for various recording mediums (wafers). The Y axis can provide a mean of a bit rate error. Each point (e.g., 402) can include a recording medium type plotted by mean thermal gradient and mean BER. A linear fit 404 can be added to the points, illustrating a trendline specifying a general relationship between thermal gradient and BER. For instance, as shown in FIG. 4, as the thermal gradient (measured in K/nm) increases, writing of the transitions is improved and BER is reduced.

Figure 5:
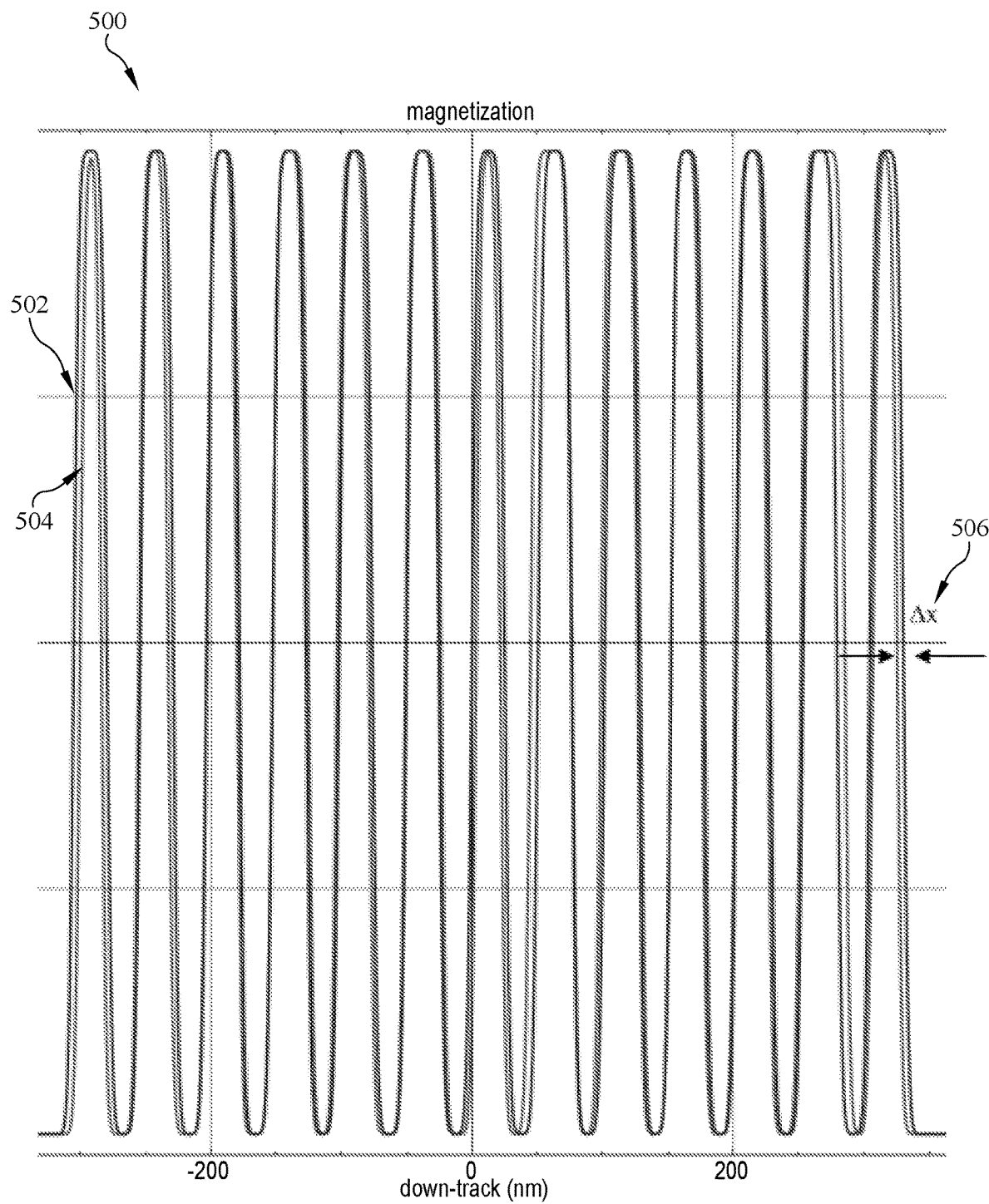
FIG. 5 is a graphical representation providing an illustration of jitter in a disk drive according to an embodiment.

As noted above, jitter in the writing to a recording material can lower system performance. Jitter can include a variance in the magnetization of the TAMR head, resulting in noise. Noise in high density recording is dominated by jitter noise. FIG. 5 is a graphical representation providing an illustration of jitter in a disk drive.

To define jitter, a perfect magnetization pattern (as shown in line 1 502) written on the disk can be compared with an actual magnetization pattern (line 2 504). Zero crossings can be equally spaced at a distance equal to the bit length. With jitter, the zero crossings can be moved. To define this movement between zero crossings, Δx 506 specifying the distance between the actual (of line 2 504) and ideal (of line 1 502) positions of the crossing can be derived. Jitter can be defined as the standard deviation of an ensemble of Δx values.

Figure 6A:
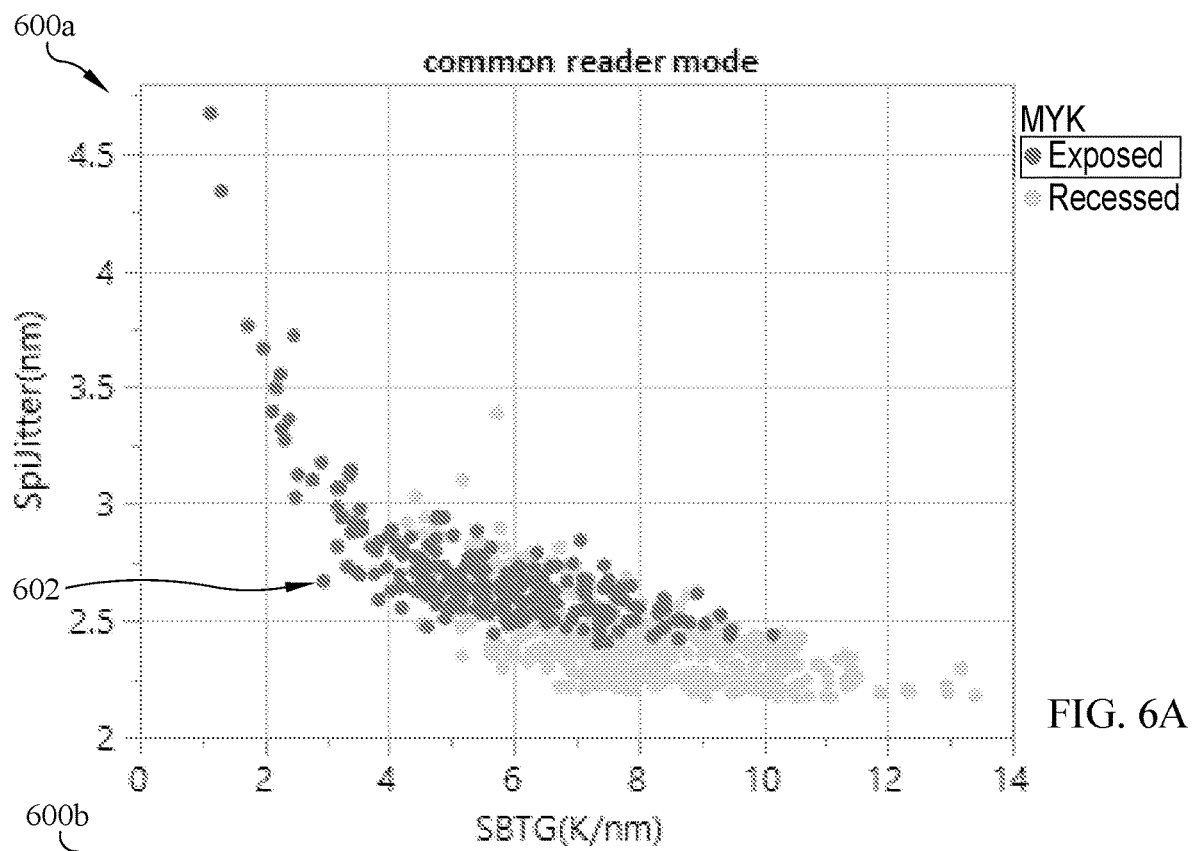
FIG. 6A provides a graphical representation of an example relationship between thermal gradient and jitter with an exposed magnetic yoke according to an embodiment.
Figure 6B:
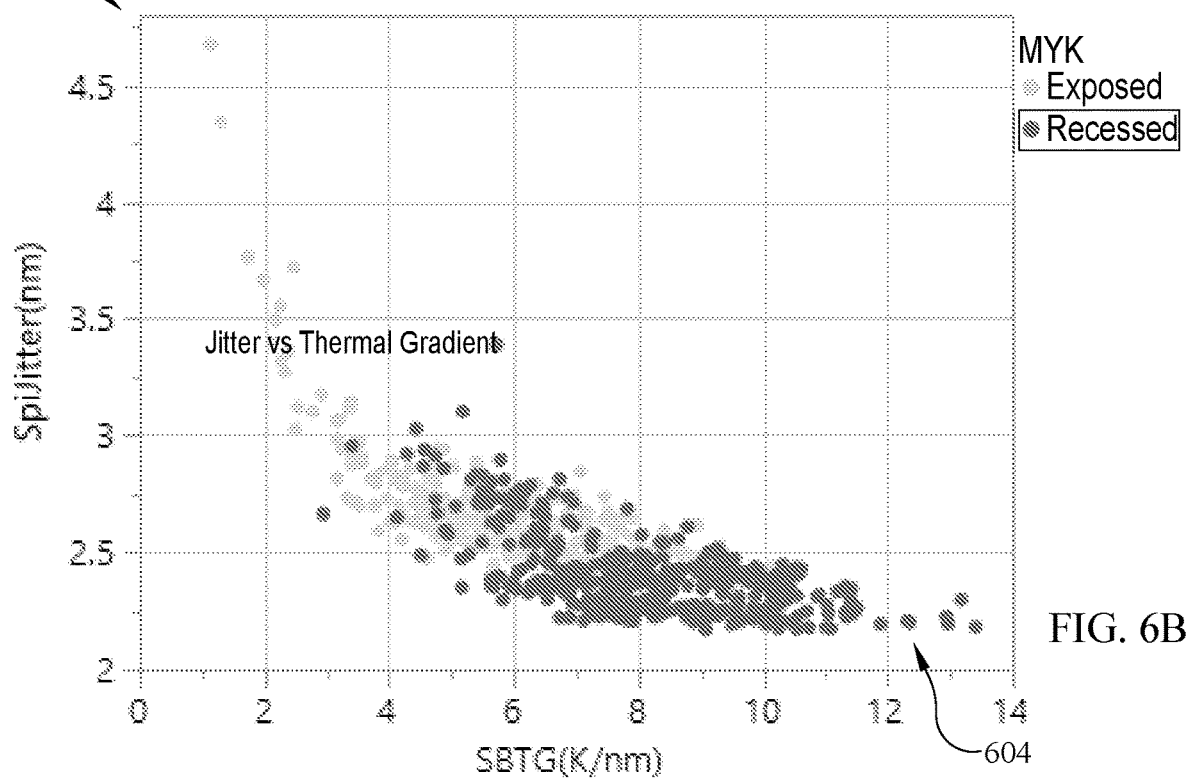
FIG. 6B provides a graphical representation of an example relationship between thermal gradient and jitter with a recessed magnetic yoke according to an embodiment.

Further, the jitter can have a relationship based on whether the magnetic yoke is exposed or recessed. FIGS. 6A and 6B provide graphical illustrations of thermal gradient and jitter. In FIG. 6A, the points 602) are identified where the magnetic yoke is exposed. In FIG. 6B, the points (e.g., 604) are identified where the magnetic yoke is recessed. FIGS. 6A-6B can represent how jitter and the thermal gradient of the NFT are in an inverse relationship. If the thermal gradient is low (1-2 K/nm), jitter is high, meaning that the writing of the transitions on the media is noisy. Increasing the thermal gradient can decrease jitter and writing quality can be improved. However, as thermal gradient increases beyond a threshold (e.g., 8-10 K/nm), jitter can reach saturation. Writing may not be improved by the NFT beyond a certain thermal gradient. Changing the magnetic pole design from exposed to recessed yoke can produce a 'step down' in jitter.

Information can be written on the disk as regions with magnetization alternatively pointing up and down (perpendicular to the disk surface). The transition region can be determined temporarily by the instance in time when the AC current through the coils changes the polarity of magnetization in the writer. Alternatively, the transition region can be determined spatially by the superposition of the magnetic field profile with the anisotropy of the media under the hot thermal spot created by the NFT. Any deviation from the perfect behavior can result in timing jitter and spatial jitter, respectively, which can add in quadrature, leading to loss in system performance (BER).

Figure 7A:
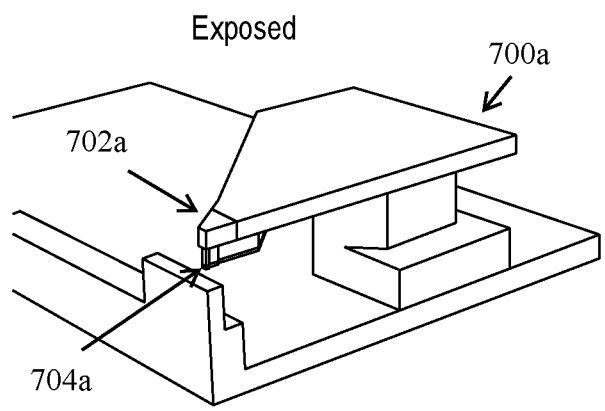
FIG. 7A illustrates an example TAMR head with an exposed magnetic yoke according to an embodiment.
Figure 7B:
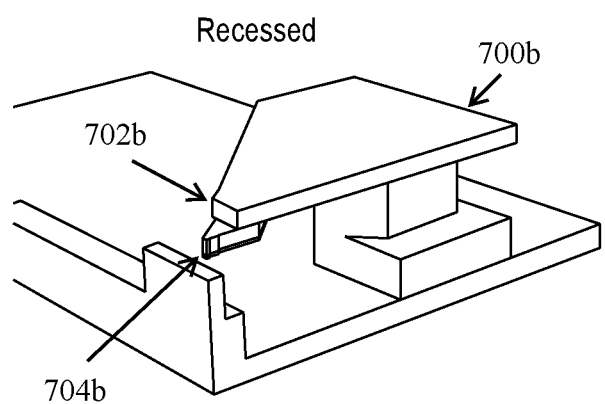
FIG. 7B illustrates an example TAMR head with a recessed magnetic yoke according to an embodiment.

FIGS. 7A and 7B illustrate example main write poles with a magnetic yoke exposed and recessed. For example, in FIG. 7A, the main write pole 700a includes a magnetic yoke 702a that is exposed. This can include the tip portion of the main write pole 704a being in direct contact with the magnetic yoke 702a. In contrast, in FIG. 7B, the main write pole 700b includes a magnetic yoke 702b that is recessed. This can include the tip portion of the main write pole 704b not being in direct contact with the magnetic yoke 702b. The state of the magnetic yoke can impact rise time as, for example, the recessed magnetic yoke can include a rise time of 110 picoseconds (ps) and the exposed magnetic yoke can include a rise time of 150 ps.

There can include a positive correlation between head field rise time and timing jitter. A shorter rise time can be correlated with smaller timing jitter. Simulations studying the dynamic reversal of the magnetization in the write pole can show that the recessed pole can include a faster rise time than the exposed pole design. Therefore, the BER can be improved by the reduction in timing jitter.

Spacing between the recording head and disk can be controlled during writing operation by using a Dynamic Flying Height (DFH) element. A variable amount of heat can be provided to the writer through an electric resistance at the DFH, to reduce head-media spacing to sub-nanometer level during the write process. The write DFH resistance can be connected to two electrical pads, where an electric voltage is applied.

A DC current can run through the main pole towards the ABS and from the ABS. The DC current can injected at the top of the magnetic yoke and ground is placed near the main pole tip, close to the ABS. Further, a parallel bias circuit can be included with write DFH heater.

Figure 8A:
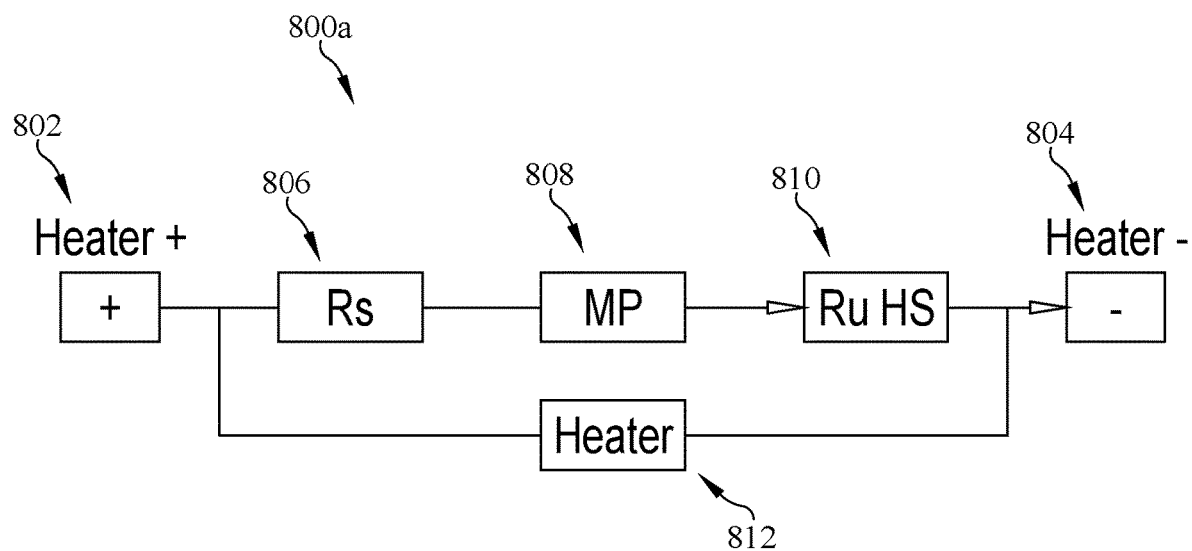
FIG. 8A is a circuit design of an example parallel bias circuit according to a first example embodiment.

FIG. 8A is a circuit design of a parallel bias circuit 800a according to a first example embodiment. As shown in FIG. 8A, electrical pads 802 and 804 be connected as part of the parallel bias circuit directing a DC current along an electrical path from the main pole to the ABS and from the ABS to the main pole. The pads 802, 804 can generate the bias current as described herein. Further, a series resistor 806 can be added in parallel with the main pole 808 and a heat sink 810. A lead and via can also be added to contact the heat sink 810 (connected to main pole (MP) 808) to the DFH Ground pad 804. A heater 812 can be connected to the parallel bias circuit in parallel with the series resistor 806, main pole 808, and heat sink 810. The heater 812 can include a resistor that can generate electrical resistance to heat a tip portion of the main write pole to control the distance of the tip portion dynamically as described herein.

Figure 8B:
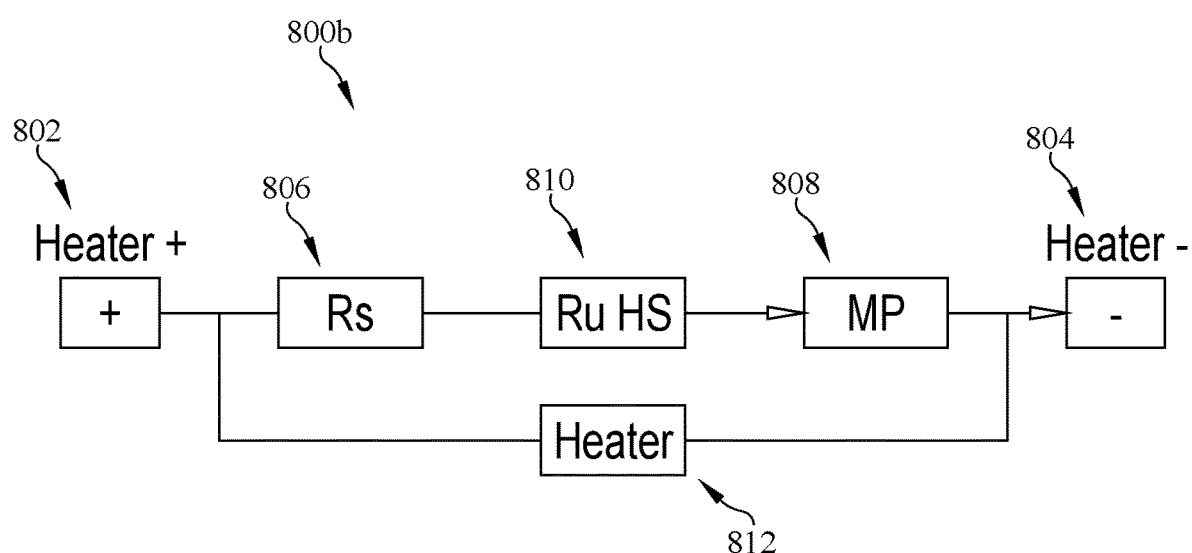
FIG. 8B is a circuit design of an example parallel bias circuit according to a second example embodiment.

FIG. 8B is a circuit design of a parallel bias circuit 800b according to a second example embodiment. As shown in FIG. 8B, the heat sink 810 can be disposed between the series resistor 806 and the main pole 808 in the parallel bias circuit 800b directing a DC current along an electrical path from the main pole to the ABS and from the ABS to the main pole.

In some embodiments, a geometry of the heat sink in the TAMR head can be modified. A metallic heat sink (e.g., comprising Ruthenium) can be in close proximity to the magnetic pole, keeping the magnetic pole relatively cool and mitigating oxidation. The metallic heat sink (HS) adjacent to the main pole can be modified such that it is much more confined geometrically.

Figure 9A:
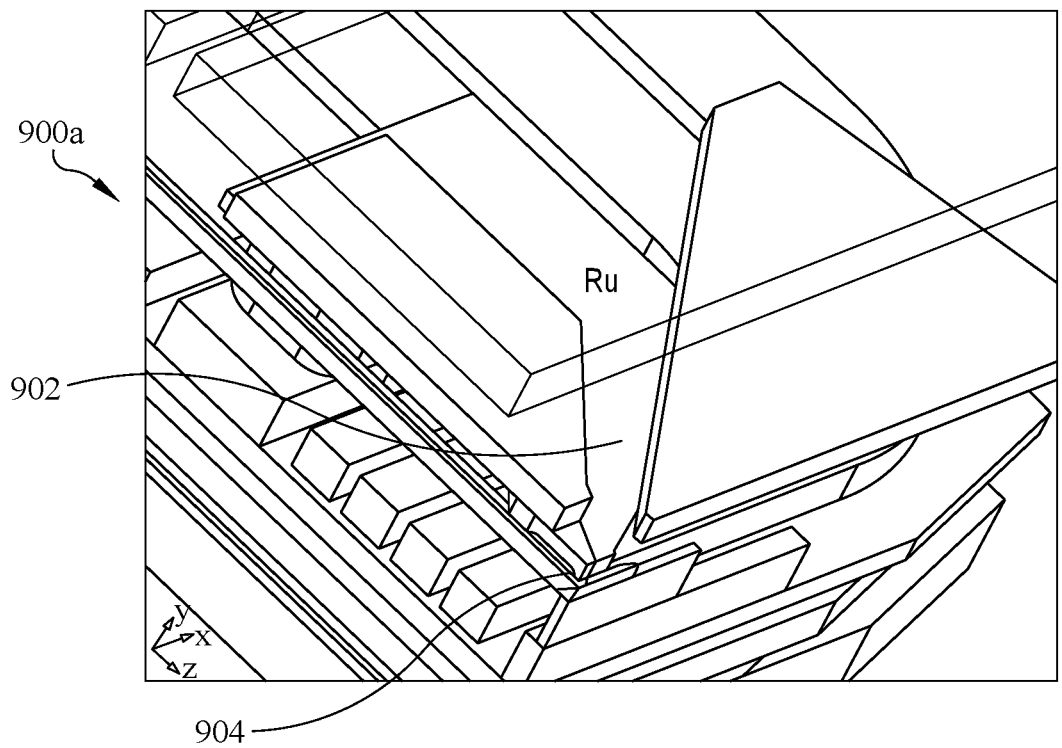
FIG. 9A illustrates a TAMR head with a first heat sink geometry according to an embodiment.
Figure 9B:
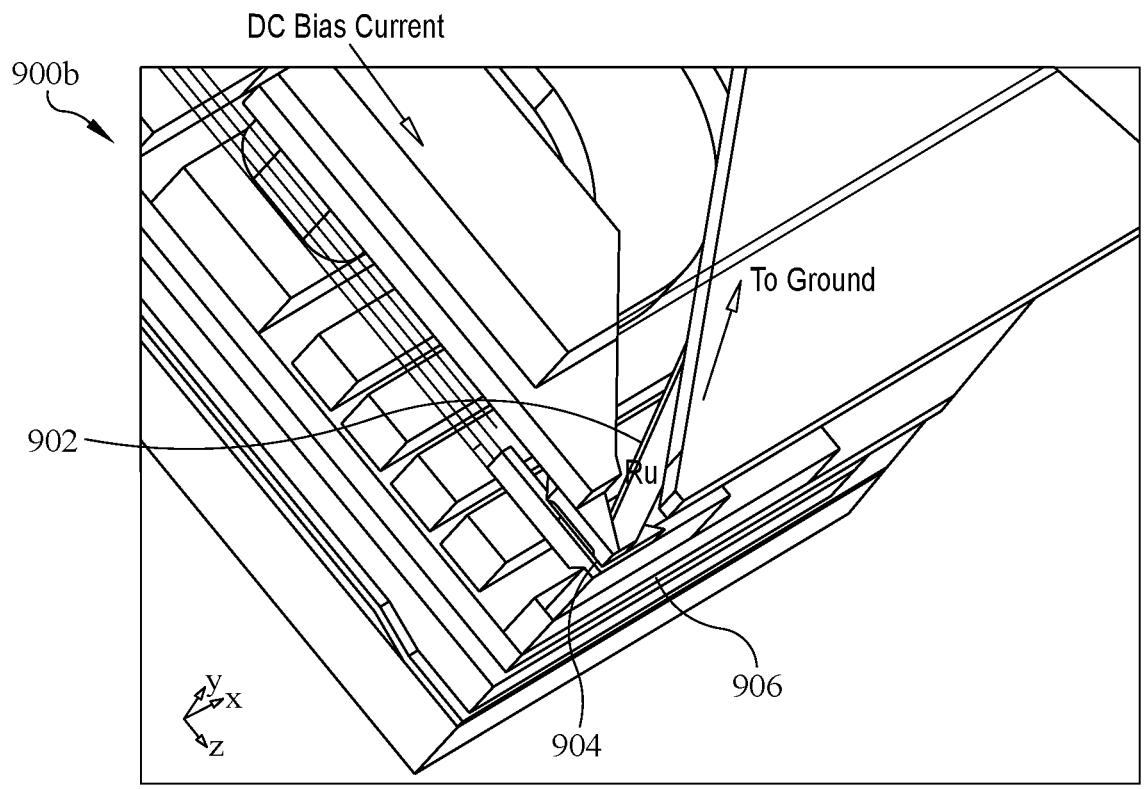
FIG. 9B illustrates a TAMR head with a second heat sink geometry according to an embodiment.

FIGS. 9A-9B provide diagrams of a TAMR head with various heat sink geometric configurations. In many TAMR designs, the heat sink can have a large surface touching the main pole. For instance, as shown in FIG. 9A, a heat sink 902 can include a large surface contacting main pole 904.

In FIG. 9B, the heat sink 902 can include a smaller surface that the heat sink shown in the embodiment as shown in FIG. 9A. The heat sink 902 can be in contact with the main pole 904. Further, in this embodiment, the heat sink 902 may include only of a thin strip touching the main pole 904 only in a region of 300-400 nm near the ABS 906. The strip can run towards the back of the head structure at an angle of 25 degrees with the ABS, being connected to the DFH Ground pad.

In some embodiments, a current density and temperature increase can occur due to the magnetic assist current (MAC). Various calculations of the modified heat sink geometric can derive insights into the impact of a DC current with the modified geometry.

Various simulations and calculations show the effect of a DC current of 20 mA, applied at the back of a magnetic yoke (MYK). The input current density can be calculated as I/MYKt/MYKw2. Thus, for I=20 mA and MYK dimensions MYKt=0.6 um, MYKw2=9um, a calculation can yield an input current density of around $4*10^{\wedge}9$ A/m$^{\wedge}2$.

Figure 10A:
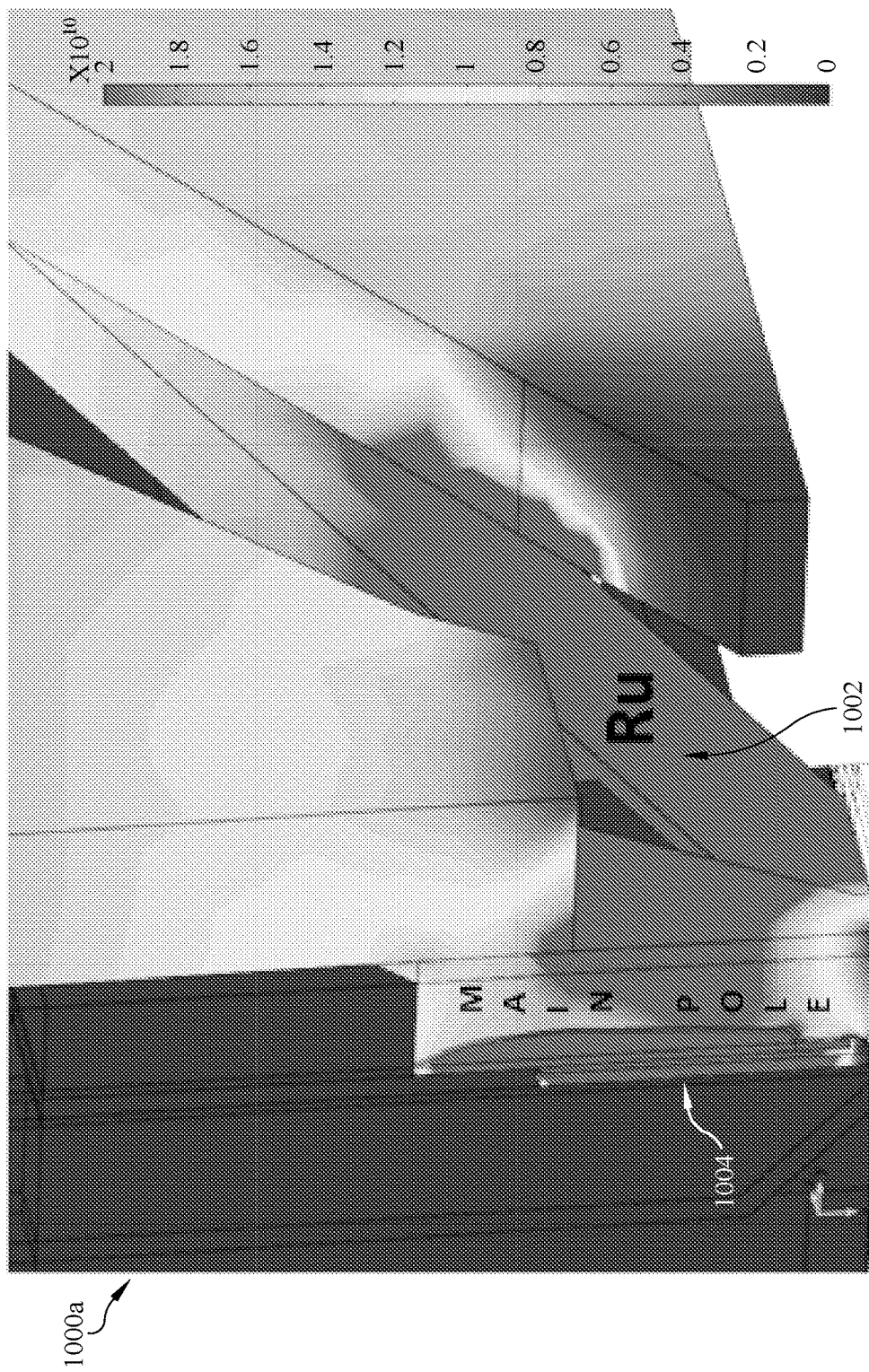
FIG. 10A provides a first graphical representation of a DC current density when a simulated current is applied to the TAMR head with a modified geometry according to an embodiment.
Figure 10B:
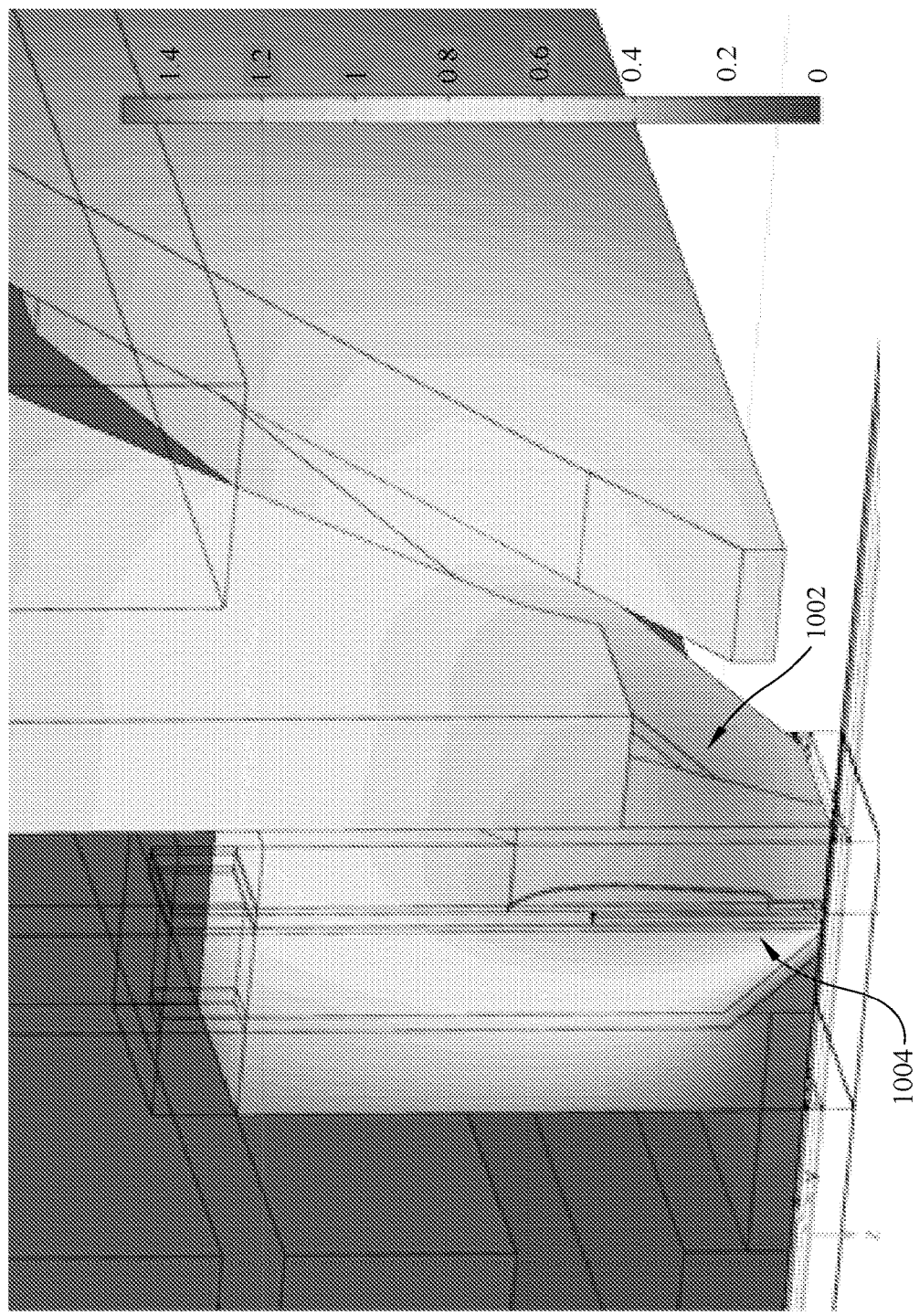
FIG. 10B provides a first graphical representation of a temperature increase when a simulated current is applied to the TAMR head with a modified geometry according to an embodiment.

FIGS. 10A-10B provide graphical representations of resulting metrics when a simulated current is applied to the TAMR head with a modified geometry. For instance, as shown in FIG. 10A, an increased DC current density can be shown in the heat sink 1002 and main pole 1004. Further, in FIG. 10B a temperature increase can be seen at the main pole 1004 and heat sink 1002. FIGS. 10A-10B can show the distribution of the MAC current flowing through the magnetic pole, as well as the resulting temperature increase (Joule effect).

Reducing the height of the heat sink can yield both larger current density (thus a stronger MAC effect), but also higher temperature in the pole. To keep the pole temperature increase less than 5% (and thus avoid possible reliability issues with pole oxidation), the HS height can be around 300 nm or around a range from 300 nm-400 nm.

Figure 11A:
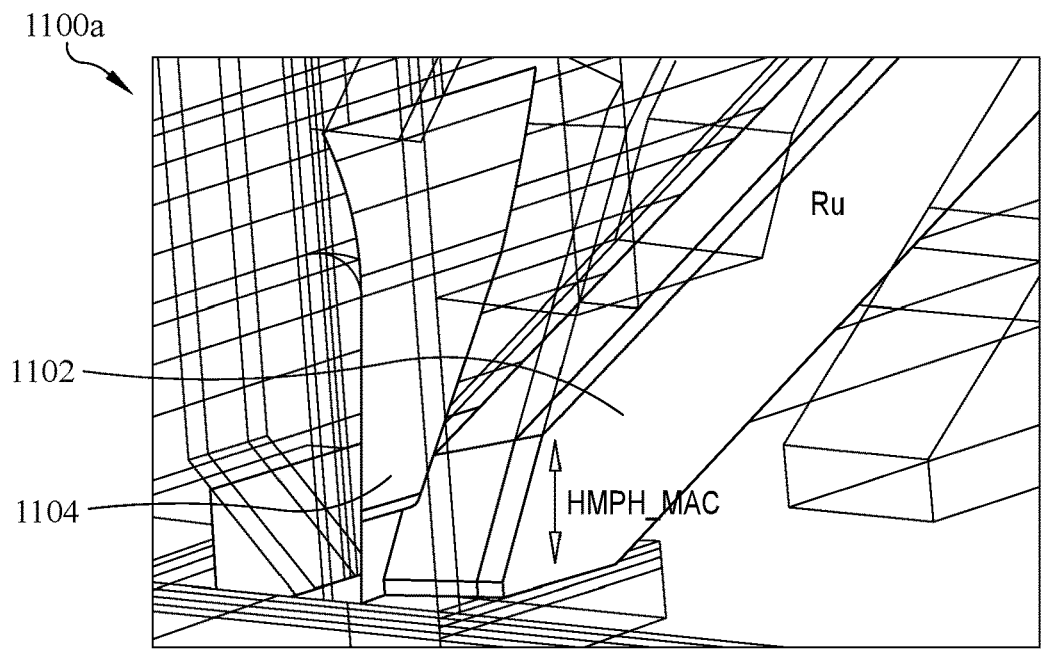
FIG. 11A illustrates a TAMR head identifying a height of a heat sink according to an embodiment.
Figure 11B:
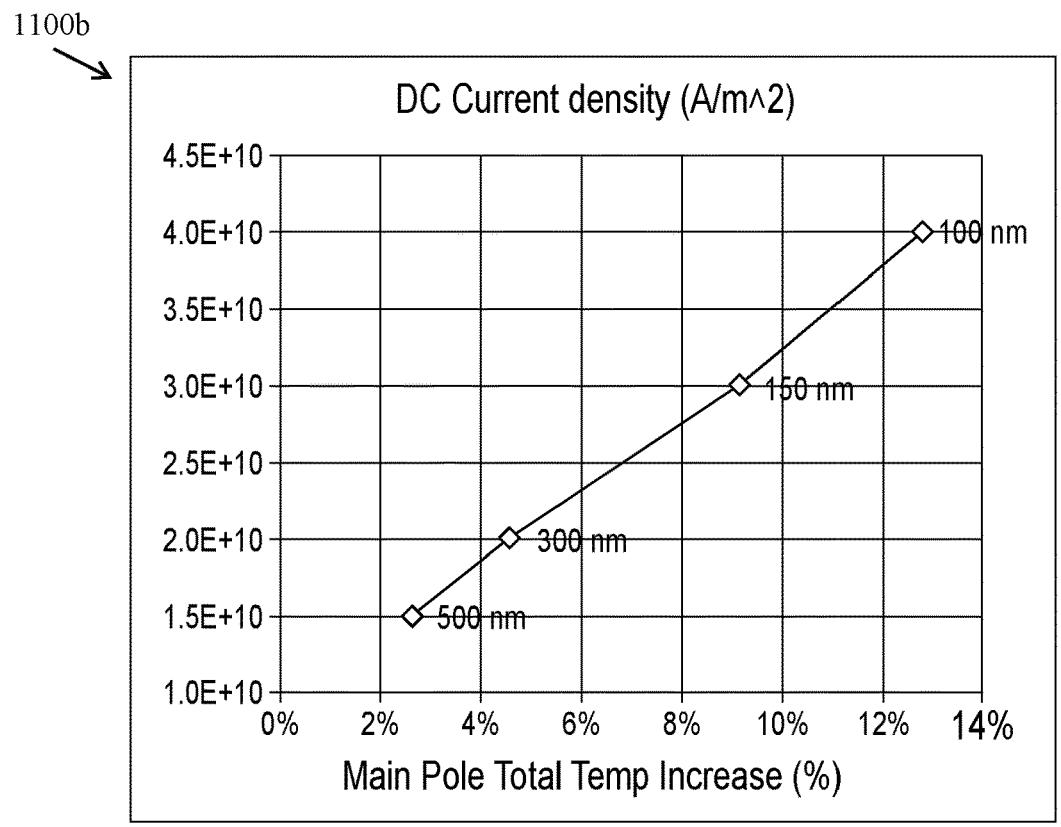
FIG. 11B provides a graphical representation of a current density and a temperature increase for various height values for a heat sink according to an embodiment.

FIG. 11A illustrates a TAMR head 1100a with a modified heat sink geometry with a denoted height of the heat sink. As shown in FIG. 11A, the heat sink can contact the main pole 1104 and can include a height denoted by HMPh_MAC. FIG. 11B provides a graphical representation 1100b of the current density and temperature increase for various heat sink heights. As shown in FIG. 11B, the reduced height of the heat sink can have a larger current density and a higher temperature. Accordingly, to keep a temperature increase less than around 5%, the heat sink height can be around 300 nm.

Figure 12:
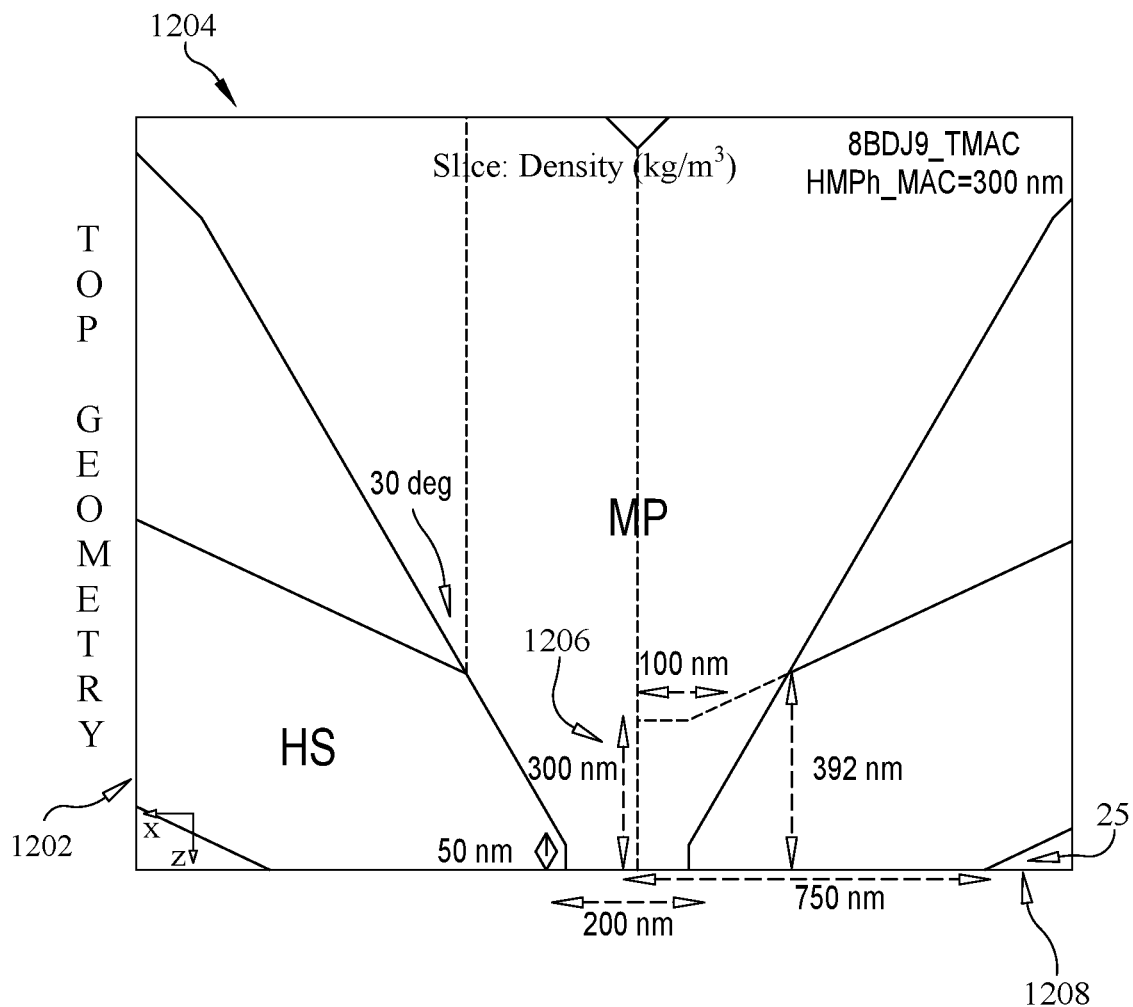
FIG. 12 provides a top geometry of a main pole and heat sink according to an embodiment.

FIG. 12 provides a top geometry of the main pole and heat sink. As shown in FIG. 12, a heat sink 1202 can be in contact with the main pole 1204. Further, the heat sink 1202 can include a height 1206 of around 300 nm. The angle of the heat sink relative to an ABS can include angle 1208 of around 25 degrees.

In a first example embodiment, a thermally-assisted magnetic recording (TAMR) head is provided. The TAMR head can include a main write pole including a tip portion and configured to direct a magnetic field for interacting with a magnetic recording medium (e.g., writing to a magnetic disk). The tip portion (e.g., 102a in FIG. 1B) can be disposed near an ABS surface near a magnetic recording material. The TAMR head can also include a magnetic yoke element (e.g., 104 in FIG. 1B) connected to the main write pole. The TAMR head can include a laser diode system configured to heat a portion of the magnetic recording medium. The laser diode system can include a laser diode, a waveguide directing a laser light source emitted by the laser diode, and an NFT disposed adjacent to the tip portion of the main write pole and configured to focus the laser light source on a portion of the magnetic recording material. The TAMR head can include a dynamic fly height (DFH) heating element to dynamically control a distance between the tip portion of the main write pole and the magnetic recording medium. For example, the heating element can include a resistor that can generate heat with electrical resistance, allowing for dynamic movement of the tip portion of the main write pole to maintain a consistent distance from the magnetic recording material. The heating element and the main write pole can be part of a parallel bias circuit that is configured to, when energized, direct a direct current (DC) bias current flow along an electrical path from the magnetic yoke element to the tip portion of the main write pole adjacent to an air bearing surface (ABS).

In some embodiments, a jitter of the main write pole can be reduced responsive to the direction of the DC current flow along the electrical path of the TAMR head. In some embodiments, the TAMR head can include least one coil disposed around an inductive pole. The at least one coil can generate an alternating current (AC) current flow that generates the magnetic field for interacting with the magnetic recording medium.

The TAMR head can include a heat sink. The heat sink can be connected to the main pole and comprises a portion of metallic material contacting the main write pole with a height in a range between 300-400 nanometers and disposed adjacent to the ABS. In some embodiments, the heat sink can be connected to a second electrical pad and is disposed at an angle of around 25 degrees with respect to the ABS. In some embodiments, the heat sink comprises Ruthenium.

The parallel bias circuit can include a series resistor. In a first example, the series resistor is disposed in the parallel bias circuit in series between a first electrical pad and the main write pole. The parallel bias circuit can further include the heat sink connected in series between the main write pole and a second electrical pad, the first electrical pad and second electrical pad generating the DC bias current. In a second example, the series resistor is disposed in the parallel bias circuit between the first electrical pad to the main write pole and ground to the heat sink.

In another example embodiment, a disk drive write head is provided. The disk drive write head can include a main write pole including a tip portion and configured to direct a magnetic field for writing to a magnetic recording medium. The disk drive write head can also include a magnetic yoke element. The disk drive write head can also include a dynamic fly height (DFH) element including a heating element to dynamically implement fly height management of the main write pole.

The disk drive write head can also include a parallel bias circuit connecting the main write pole, magnetic yoke element, and the heater. The parallel bias circuit can also include a series resistor and electrical pads that, when energized, generate a direct current (DC) bias current flow along an electrical path from the magnetic yoke element to the tip portion of the main write pole adjacent to an air bearing surface (ABS).

In another example embodiment, method for applying a bias current to a thermally-assisted magnetic recording (TAMR) head is provided. The method comprising heating a magnetic recording material. This can be performed by a laser diode system as described herein. The method can also include generating an alternating current (AC) current flow by one or more coils connected to a main write pole. The AC current flow can generate a magnetic field for interacting with the magnetic recording material after the magnetic recording surface is heated by the laser diode system. The method can also include generating, by electrical pads part of a parallel bias circuit, a direct current (DC) bias current flow configured to flow along an electrical path from a magnetic yoke element to a tip portion of the main write pole adjacent to an air bearing surface (ABS).

The present embodiment provide a number of advantages. For instance, by applying a DC bias current to the main pole, domain motion during magnetization switching can be more predictable.

Further, information is written on the disk as regions with magnetization alternatively pointing up and down (perpendicular to the disk surface). The transition region can be determined temporally by the instance in time when the AC current to the writer through the coils changes polarity and spatially by the superposition of the magnetic field profile with the anisotropy of the media under the hot thermal spot created by the NFT. Any excursion from the perfect behavior can add in timing jitter and spatial jitter, respectively, which add in quadrature, leading to loss in system performance (BER). Timing jitter can be as much as 1 nm of the total jitter of the ~2 nm measured in TAMR. Applying a magnetic assist current can lead to a significant reduction in timing jitter.

Additionally, timing jitter can have a stochastic component due to the random process of domain wall pinning inside the magnetic pole, when the magnetization changes direction. Applying a DC bias current (MAC) can lead to eliminating the pinning events, thus significantly reducing timing jitter. Further, there can be a high positive correlation between timing jitter and the rise time of the magnetic writer. BER gain can be provided in TAMR by changing the magnetic yoke (MYK) design from exposed (slower) to recessed (faster), highlighting the importance of rise time reduction (and subsequently timing jitter reduction.

It will be understood that terms such as "top," "bottom," "above," "below," and x- direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A thermally-assisted magnetic recording (TAMR) head comprising:
    a main write pole including a tip portion and configured to direct a magnetic field for interacting with a magnetic recording medium;
    a magnetic yoke element connected to the main write pole;
    a laser diode system configured to heat a portion of the magnetic recording medium; and
    a dynamic fly height (DFH) heating element to dynamically control a distance between the tip portion of the main write pole and the magnetic recording medium,
    wherein the DFH heating element and the main write pole are part of a parallel bias circuit that is configured to, when energized, direct a direct current (DC) bias current flow along an electrical path from the magnetic yoke element to the tip portion of the main write pole adjacent to an air bearing surface (ABS).

2. The TAMR head of claim 1, wherein the TAMR head comprises a heat sink.

3. The TAMR head of claim 1, wherein the laser diode system includes:
    a laser diode configured to emit a laser light source;
    a waveguide configured to direct the laser light source; and
    a near field transducer disposed adjacent to the tip portion of the main write pole and configured to focus the laser light source onto the magnetic recording medium.

4. The TAMR head of claim 2, wherein the parallel bias circuit comprises a series resistor configured to control the DC bias current flow.

5. The TAMR head of claim 4, wherein the series resistor is connected to a first electrical pad and disposed in the parallel bias circuit in series with the main write pole and the heat sink, wherein the series resistor, main write pole, and heat sink are connected in parallel to the DFH heating element.

6. The TAMR head of claim 5, wherein the parallel bias circuit further includes the heat sink connected to the main write pole and a second electrical pad, the first electrical pad and the second electrical pad generating the DC bias current flow.

7. The TAMR head of claim 4, wherein the series resistor is disposed in the parallel bias circuit in series to the main write pole and the heat sink comprising a ground.

8. The TAMR head of claim 2, wherein the heat sink is connected to the main pole and comprises a portion of metallic material contacting the main write pole with a height in a range between 300-400 nanometers and disposed adjacent to the ABS, and wherein the heat sink is disposed at an angle of around 25 degrees with respect to the ABS.

9. The TAMR head of claim 1, wherein a jitter of the main write pole is reduced responsive to the direction of the DC current flow along the electrical path of the TAMR head.

10. The TAMR head of claim 1, further comprising:
    at least one coil disposed around an inductive pole, the inductive pole connected to any of the magnetic yoke element and main write pole, wherein the at least one coil generates an alternating current (AC) current flow directed between the inductive pole, magnetic yoke, and main write pole to generate the magnetic field for interacting with the magnetic recording medium.

11. The TAMR head of claim 1, wherein the magnetic yoke element is disposed above the main write pole relative to the ABS, and wherein the magnetic yoke element is recessed from the tip portion of the main write pole such that the tip portion is not in direct contact with the magnetic yoke element.

12. A disk drive write head comprising:
    a main write pole including a tip portion and configured to direct a magnetic field for interacting with a magnetic recording medium;
    a magnetic yoke element;
    a laser diode system configured to heat a portion of the magnetic recording medium; and
    a heating element, wherein the heating element and the main write pole are part of a parallel bias circuit that is configured to, when energized, direct a direct current (DC) bias current flow along an electrical path from the magnetic yoke element to the tip portion of the main write pole adjacent to an air bearing surface (ABS).

13. The disk drive write head of claim 12, further comprising a heat sink comprising Ruthenium.

14. The disk drive write head of claim 13, wherein the parallel bias circuit includes a series resistor is disposed in the parallel bias circuit in series between a first electrical pad and the main write pole.

15. The disk drive write head of claim 14, wherein the parallel bias circuit further includes the heat sink connected in series between the main write pole and a second electrical pad, the first electrical pad and second electrical pad generating the DC bias current.

16. The disk drive write head of claim 14, wherein the magnetic yoke element is disposed above the main write pole relative to the ABS, and wherein the magnetic yoke element is recessed from the tip portion of the main write pole such that the tip portion is not in direct contact with the magnetic yoke.

17. The disk drive write head of claim 13, wherein the heat sink is connected to the main pole and comprises a portion of metallic material contacting the main write pole with a height in a range between 300-400 nanometers and disposed adjacent to the ABS, and wherein the heat sink is disposed at an angle of around 25 degrees with respect to the ABS.

18. A method for applying a bias current to a thermally-assisted magnetic recording (TAMR) head, the method comprising:
  heating, by a heating element, a magnetic recording material;
  generating an alternating current (AC) current flow by one or more coils connected to a main write pole via an inductive pole, the AC current flow generating a magnetic field for interacting with the magnetic recording material; and
  generating, by a parallel bias circuit, a direct current (DC) bias current flow configured to flow along an electrical path from a magnetic yoke element to a tip portion of the main write pole adjacent to an air bearing surface (ABS).

19. The method of claim 18, wherein the main write pole, magnetic yoke element, and the heating element are part of the parallel bias circuit.

20. The method of claim 19, wherein the parallel bias circuit includes:
  a series resistor connected to a first electrical pad and in series with the main write pole; and
  a heat sink connected in series with the main write pole and connected to a second electrical pad, the heating element disposed in parallel to the series resistor, main write pole, and heat sink, the first electrical pad and second electrical pad generating the DC bias current.

* * * * *